United States Patent
Smith

(10) Patent No.: US 9,281,871 B2
(45) Date of Patent: Mar. 8, 2016

(54) WIRELESS POWER TRANSFER—NEAR FIELD COMMUNICATION ENABLED COMMUNICATION DEVICE

(75) Inventor: Aaron Smith, Berkshire (GB)

(73) Assignee: Broadcom Corporation, Irvine, CA (US)

(*) Notice: Subject to any disclaimer, the term of this patent is extended or adjusted under 35 U.S.C. 154(b) by 488 days.

(21) Appl. No.: 13/595,020

(22) Filed: Aug. 27, 2012

(65) Prior Publication Data

US 2014/0057559 A1    Feb. 27, 2014

(51) Int. Cl.
*H04B 5/00* (2006.01)
*H04B 5/02* (2006.01)

(52) U.S. Cl.
CPC ............ *H04B 5/0037* (2013.01); *H04B 5/00* (2013.01); *H04B 5/02* (2013.01)

(58) Field of Classification Search
CPC ........ H04B 5/00; H04B 5/006; H04B 5/0012; H04B 5/0018; H04B 5/0025; H04B 5/0031; H04B 5/0037; H04B 5/0043; H04B 5/005; H04B 5/0056; H04B 5/0062; H04B 5/0068; H04B 5/0075; H04B 5/0081; H04B 5/0087; H04B 5/0093
See application file for complete search history.

(56) References Cited

U.S. PATENT DOCUMENTS

| | | | |
|---|---|---|---|
| 7,809,012 B2 | 10/2010 | Ruuska et al. | |
| 8,085,834 B2 * | 12/2011 | Hanke et al. | ................. 375/220 |
| 8,446,046 B2 | 5/2013 | Fells et al. | |
| 2007/0297356 A1 * | 12/2007 | Rofougaran | ................... 370/328 |
| 2008/0079636 A1 * | 4/2008 | Mohamadi | ............. 343/700 MS |
| 2010/0174629 A1 | 7/2010 | Taylor et al. | |
| 2011/0306295 A1 * | 12/2011 | Butler et al. | ................. 455/41.1 |
| 2012/0005497 A1 | 1/2012 | Tsukamoto et al. | |
| 2012/0298760 A1 * | 11/2012 | Li et al. | ......................... 235/492 |

FOREIGN PATENT DOCUMENTS

| | | |
|---|---|---|
| CN | 101262254 A | 9/2008 |
| CN | 201663491 U | 12/2010 |

(Continued)

OTHER PUBLICATIONS

Chinese Office Action mailed on Mar. 18, 2015, directed to co-pending Chinese Application No. CN20130378647.3; 6 pages.

(Continued)

*Primary Examiner* — Golam Sorowar
(74) *Attorney, Agent, or Firm* — Sterne, Kessler, Goldstein & Fox P.L.L.C.

(57) ABSTRACT

Various configurations and arrangements of various communication devices are disclosed. Various integrated circuits that form these communication devices can be fabricated onto one or more semiconductor substrates, chips, and/or dies using a high voltage semiconductor process, a low voltage semiconductor process, or any combination thereof. Some of these high voltage and/or low voltage semiconductor process integrated circuits can be fabricated along with other high voltage and/or low voltage semiconductor process integrated circuits of other modules onto a single semiconductor substrate, chip, and/or die. This allows the low voltage semiconductor process integrated circuits and/or high voltage semiconductor process integrated circuits of one module to be combined with low voltage semiconductor process integrated circuits and/or high voltage semiconductor process integrated circuits of another module of the communication device.

23 Claims, 5 Drawing Sheets

(56) References Cited

FOREIGN PATENT DOCUMENTS

| | | | |
|---|---|---|---|
| CN | 102239619 | A | 11/2011 |
| CN | 102314359 | A | 1/2012 |

OTHER PUBLICATIONS

English Language Abstract for CN201663491 U, published Dec. 1, 2010; 1 page.

* cited by examiner

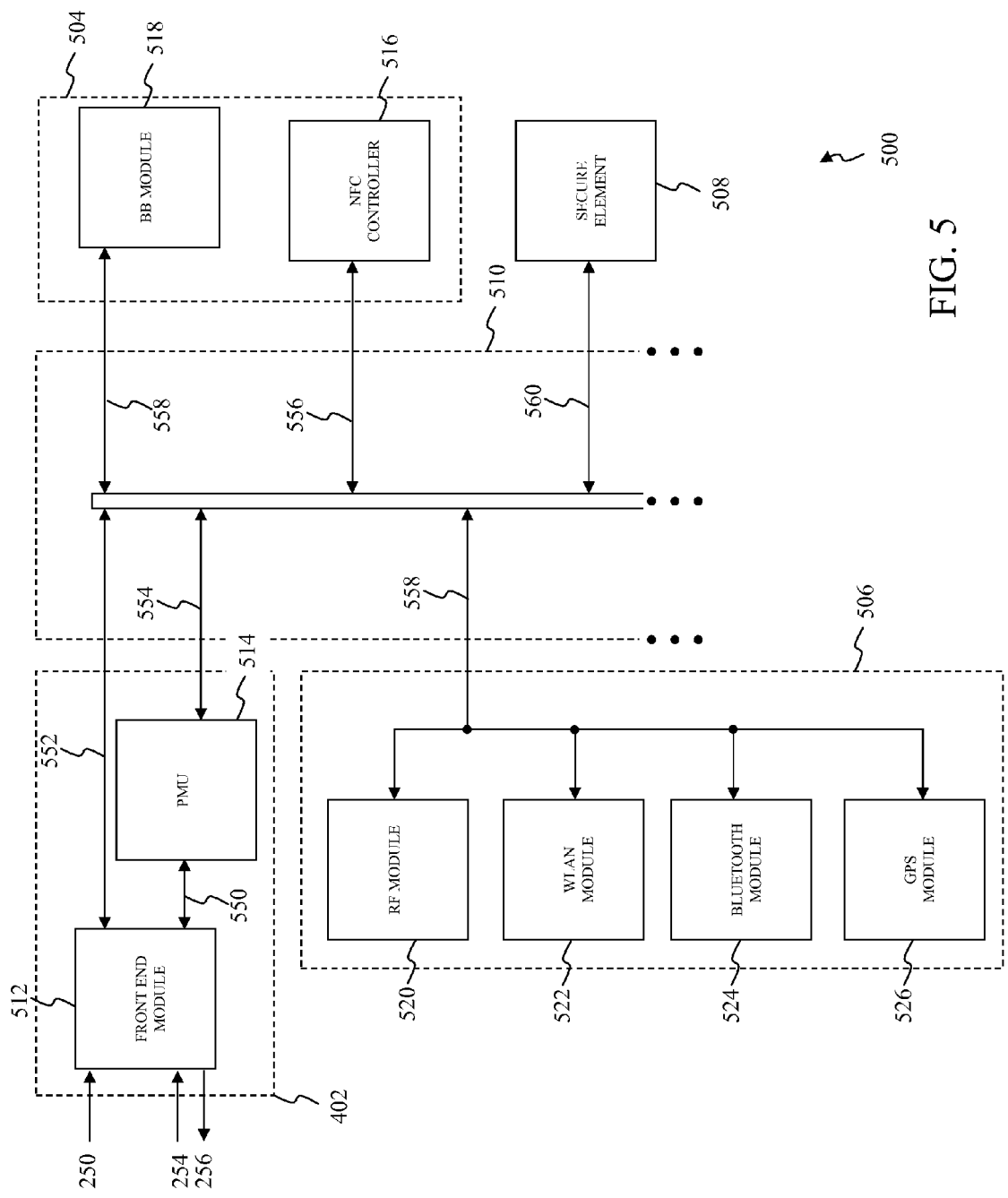

WIRELESS POWER TRANSFER—NEAR FIELD COMMUNICATION ENABLED COMMUNICATION DEVICE

BACKGROUND

1. Field of Disclosure

The present disclosure relates generally to a communication device, and more specifically to implementing of wireless power transfer (WPT) and near field communication (NFC) within the communication device.

2. Related Art

Cellular phones have evolved from large devices that were only capable of analog voice communications to comparatively smaller devices that are capable of digital voice communications and digital data communications, such as Short Message Service (SMS) for text messaging, email, packet switching for access to the Internet, gaming, Bluetooth, and Multimedia Messaging Service (MMS) to provide some examples. In addition to these capabilities, the cellular phones of today have additional non-communication related capabilities, such audio and/or video recording to provide an examples, and software applications such as a calendar and a phone book, to provide some examples. Even in light of these capabilities, manufacturers of cellular phones are placing even more capabilities into cellular phones and making these more power cellular phones smaller. For example, the manufacturers are placing wireless power transfer (WPT) capabilities in cellular phones to allow these WPT enabled cellular phones to wireless charge their internal batteries from a wireless power source without the use of a wired connection.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

FIG. 1 illustrates a block diagram of a first exemplary wireless power transfer (WPT) enabled communication device according to an exemplary embodiment of the present disclosure;

FIG. 2 further illustrates the block diagram of the first exemplary WPT enabled communication device according to an exemplary embodiment of the present disclosure;

FIG. 5 further illustrates the block diagram of the second exemplary WPT enabled communication device according to an exemplary embodiment of the present disclosure.

Figure 1:
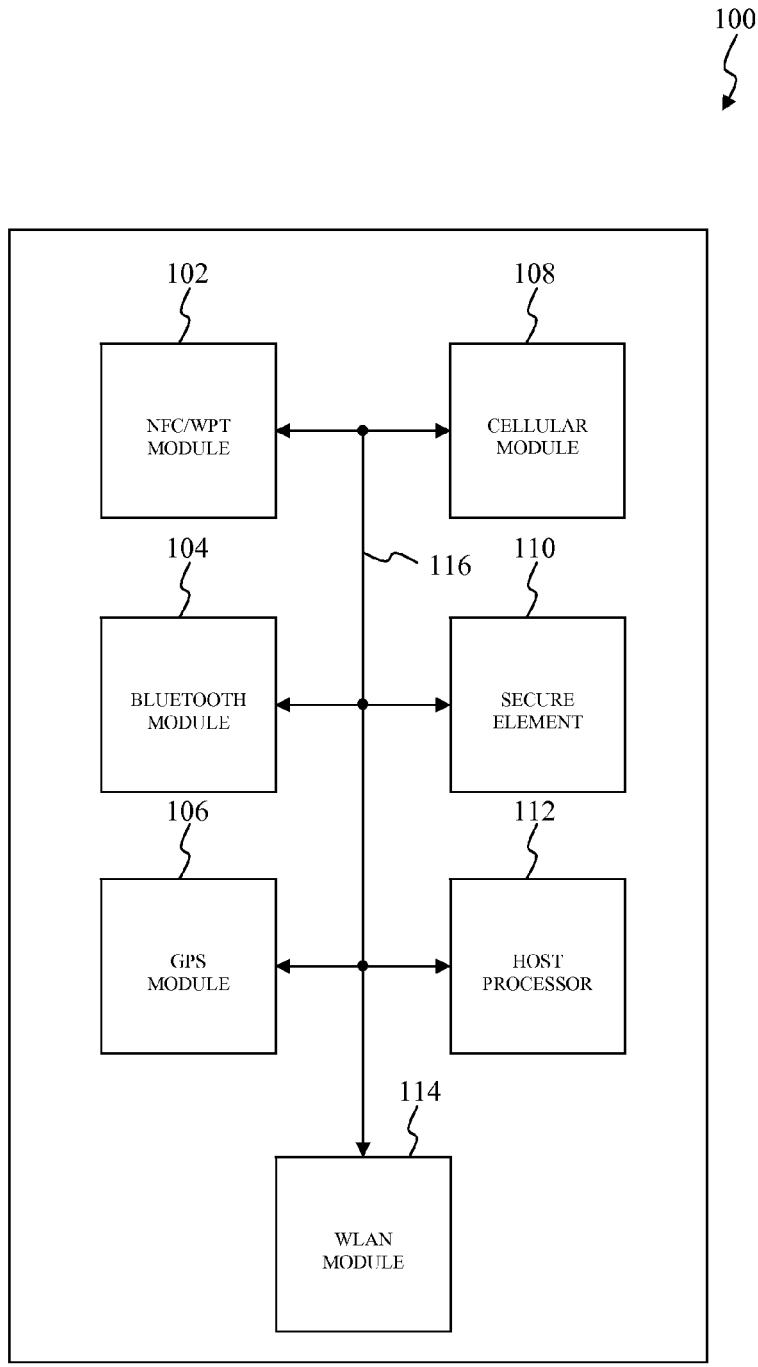

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Overview

The following Detailed Description describes various configurations and arrangements of various wireless power transfer (WPT) enabled communication devices. The WPT enabled communication devices include various integrated circuits that can be fabricated onto one or more semiconductor substrates, chips, and/or dies using a high voltage semiconductor process, a low voltage semiconductor process, or any combination thereof. Some of these integrated circuits that are fabricated with the high and the low voltage semiconductor processes can be fabricated onto a single semiconductor substrate, chip, and/or die along with other integrated circuits that also are fabricated with the high and the low voltage semiconductor processes. This allows the integrated circuits of one module to be combined with integrated circuits of another module of the WPT enabled communication device.

First Exemplary WPT Enabled Communication Device

FIG. 1 illustrates a block diagram of a first exemplary WPT enabled communication device according to an exemplary embodiment of the present disclosure. A WPT enabled communication device 100 communicates information over wired and/or wireless communication networks in accordance with various communication standards. The WPT enabled communication device 100 can represent a mobile communication device, such as a cellular phone or a smartphone, a mobile computing device, such as a tablet computer or a laptop computer, or any other electronic device that is capable of communicating information over communication networks that will be apparent to those skilled in the relevant art(s) without departing from the spirit and scope of the present invention. The WPT enabled communication device 100 can include a near field communication (NFC)/wireless power transfer (WPT) module 102, a Bluetooth Module 104, a Global Position System (GPS) module 106, a cellular module 108, a secure element 110, a host processor 112, a wireless local area network (WLAN) module 114, or any combination thereof which are communicatively coupled to one another via a communication interface 116. It should be noted that the WPT enabled communication device 100 need not include all of: the NFC/WPT module 102, the Bluetooth Module 104, the GPS module 106, the cellular module 108, the secure element 110, the host processor 112, and/or the WLAN module 114. Those skilled it the relevant art(s) will recognize that other configurations and arrangements of the WPT enabled communication device 100 are possible without departing from the spirit and scope of the present disclosure. Additionally, those skilled in the relevant art(s) will also recognize that the NFC/WPT module 102, the Bluetooth Module 104, the GPS module 106, the cellular module 108, the secure element 110, the host processor 112, and/or the WLAN module 114 need not be communicatively coupled to one another via a communication interface 116. In these situations, those modules that are communicatively coupled to the communication interface 116 can independently communicate with other communication enabled devices without internal communication.

The NFC/WPT module 102 provides wireless communication between the WPT enabled communication device 100 and another NFC capable device in accordance with various NFC standards. The NFC/WPT module 102 is configurable to operate in an initiator, or a reader, mode of operation to initiate communications with another NFC capable device or in a target, or a tag, mode of operation to receive communications from another NFC capable device. Additionally, the NFC/WPT module 102 can derive or harvest power from communications received from this other NFC capable device when operating in the tag mode of operation. Typically, the power derived or harvested from the received communications is adequate to operate the NFC/WPT module 102 and/or the secure element 110.

Additionally, the NFC/WPT module 102 supports wireless transmission of power, referred to as WPT, from a wireless power transmitter or another similar electronic device that emits a magnetic field. The NFC/WPT module 102 can derive or harvest power from a received WPT signal, such as a magnetic resonance that is provided by the wireless power transmitter. Typically, this power derived or harvested from the received WPT signal is adequate to operate at least the NFC/WPT module 102 and the secure element 110.

The Bluetooth Module 104 provides wireless communication between the WPT enabled communication device 100 and another Bluetooth capable device in accordance with various Bluetooth or Bluetooth Low Energy (BLE) standards. The Bluetooth Module 104 is configurable to operate in a master mode of operation to initiate communications with another Bluetooth capable device or in a slave mode of operation to receive communications from another Bluetooth capable device.

The GPS Module 106 receives various signals from various satellites to calculate a position of the WPT enabled communication device 100. The GPS Module 106 is typically implemented using a Global Navigation Satellite System (GNSS) receiver that uses the GPS, GLONASS, Galileo and/or Beidou systems for calculating the position of the WPT enabled communication device 100.

The cellular module 108 provides wireless communication between the WPT enabled communication device 100 and another cellular capable device over a cellular network in accordance with various cellular communication standards such as a Generation Partnership Project (3GPP) Long Term Evolution (LTE) communications standard, a fourth generation (4G) mobile communications standard, or a third generation (3G) mobile communications standard to provide some examples. The cellular module 108 can communicate with one or more transceivers, referred to as base stations or access points, within the cellular network to provide voice or data communications between the WPT enabled communication device 100 and another cellular capable device. The transceivers are often connected to a cellular telephone exchange that connects to a public telephone network or to another cellular telephone exchange within the cellular network.

The secure element 110 securely stores applications and/or information such as payment information, authentication information, ticketing information, and/or marketing information to provide some examples, within the WPT enabled communication device 100 and provides for an environment to secure execution of these applications. The secure element 110 can be implemented as a separate secure smart card chip, in a subscriber identity module (SIM)/Universal Integrated Circuit Card (UICC), or in a secure digital (SD) card that can be inserted in the WPT enabled communication device 100.

The host processor 112 controls overall operation and/or configuration of the WPT enabled communication device 100. The host processor 112 can receive information from a user interface such as a touch-screen display, an alphanumeric keypad, a microphone, a mouse, a speaker, and/or from other electrical devices or host devices that are coupled to the WPT enabled communication device 100. The host processor 112 can provide this information to the NFC/WPT module 102, the Bluetooth Module 104, the GPS module 106, the cellular module 108, the secure element 110, and/or the WLAN module 114. Additionally, the host processor 112 can receive information from the NFC/WPT module 102, the Bluetooth Module 104, the Global Position System (GPS) module 106, the cellular module 108, the secure element 110, and/or the WLAN module 114. The host processor 112 can provide this information to the user interface, to other electrical devices or host devices, and/or to the NFC/WPT module 102, the Bluetooth Module 104, the GPS module 106, the cellular module 108, the secure element 110, and/or the WLAN module 114. Further, the host processor 112 can execute one or more applications such as Short Message Service (SMS) for text messaging, electronic mailing, and/or audio and/or video recording to provide some examples, and/or software applications such as a calendar and/or a phone book to provide some examples.

The WLAN module 114 provides wireless communication between the WPT enabled communication device 100 and another WLAN capable device over a wired and/or wireless communication network in accordance with various networking protocols such a Worldwide Interoperability for Microwave Access (WiMAX) communications standard or a Wi-Fi communications standard to provide some examples. The WLAN module 114 can operate as an access point to provide communications between other WLAN capable devices and a communication network or as a client to communicate with another access point, such as a wireless router to provide an example, to access the communication network.

The communication interface 116 routes various communications between the NFC/WPT module 102, the Bluetooth Module 104, the GPS module 106, the cellular module 108, the secure element 110, the host processor 112, and/or the WLAN module 114. These communications can include various digital signals, such as one or more commands and/or data to provide some examples, various analog signals, such as direct current (DC) currents and/or voltages to provide some examples, or any combination thereof. The communication interface 116, as well as other communication interfaces that are discussed below, can be implemented as a series of wired and/or wireless interconnections between the NFC/WPT module 102, the Bluetooth Module 104, the GPS module 106, the cellular module 108, the secure element 110, the host processor 112, and/or the WLAN module 114. The interconnections of communication interface 116, as well as interconnections of other communication interfaces that are discussed below, can be arranged to form a parallel interface to carry communications between various modules of the WPT enabled communication device 100 in parallel using multiple conductors, a serial interface to carry communications between various modules of the WPT enabled communication device 100 using a single conductor, or any combination thereof.

Further Illustration of the First Exemplary WPT Enabled Communication Device

Typically, a WPT enabled communication device, such as the WPT enabled communication device 100 to provide an example, includes one or more integrated circuits that are configured and arranged to form one or more modules, such as the NFC/WPT module 102, the Bluetooth Module 104, the GPS module 106, the cellular module 108, the secure element 110, the host processor 112, and/or the WLAN module 114 to provide some examples. These integrated circuits can be fabricated onto one or more semiconductor substrates, chips, and/or dies using a high voltage semiconductor process, referred to as high voltage semiconductor process integrated circuits, a low voltage semiconductor process, referred to as low voltage semiconductor process integrated circuits, or any combination thereof. In an exemplary embodiment, the high voltage semiconductor process is a Bipolar Complementary Metal Oxide Semiconductor (BiCMOS) process and the low voltage semiconductor process is a 28 nm or 40 nm CMOS process. However, other high voltage and/or low voltage semiconductor processes are possible as will be apparent to those skilled in the relevant art(s) without departing from the spirit and scope of the present invention.

Generally, the high voltage semiconductor process integrated circuits can operate at greater power levels, such as greater voltages and/or greater currents, when compared to the low voltage semiconductor process integrated circuits. The high voltage semiconductor process integrated circuits occupy more real estate, namely have larger physical dimensions, in comparison to the low voltage semiconductor process integrated circuits. These larger physical dimensions allow the high voltage semiconductor process integrated circuits to operate at the greater power levels. However, these larger physical dimensions undesirably increase parasitic components, such as capacitance, inductance, and/or resistance to provide some examples, within the high voltage semiconductor process integrated circuits. As a result, the high voltage semiconductor process integrated circuits typically operate at lesser speeds when compared to the low voltage semiconductor process integrated circuits.

Figure 2:
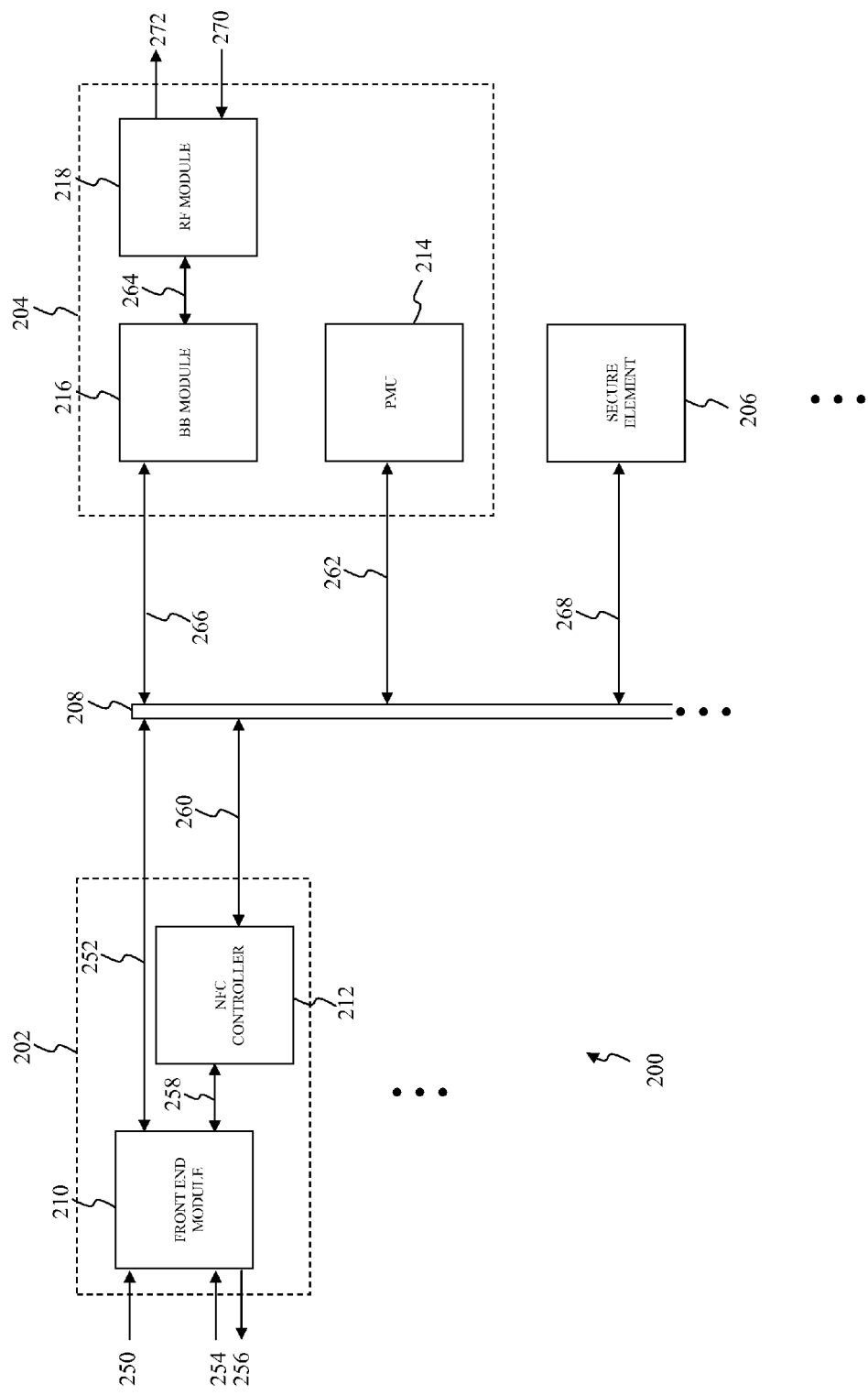

FIG. 2 further illustrates the block diagram of the first exemplary WPT enabled communication device according to an exemplary embodiment of the present disclosure. A WPT enabled communication device 200 includes one or more integrated circuits that are configured and arranged to form one or more modules that are used to communicate information over wired and/or wireless communication networks in accordance with various communication standards. Some of these modules, or portions thereof, that operate at greater power levels can be fabricated using the high voltage semiconductor process. These modules, or these portions thereof, cannot safely and reliably operate at these greater power levels if fabricated using the low voltage semiconductor process. Other modules of the WPT enabled communication device 200, or portions thereof, that operate at greater speeds are typically formed using the low voltage semiconductor process. These modules, or these portions thereof, cannot reliably operate at these greater speeds if fabricated using the high voltage semiconductor process. Additional modules, or portions thereof, that neither operate at the greater power levels nor the greater speeds are typically formed using the low voltage semiconductor process to decrease their occupied real estate when compared to being formed using the high voltage semiconductor process.

The WPT enabled communication device 200 includes an NFC/WPT module 202, a cellular module 204, and a secure element 206 which are communicatively coupled to one another via a communication interface 208. The WPT enabled communication device 200 can represent an exemplary embodiment of the WPT enabled communication device 100. As such, the NFC/WPT module 202, the cellular module 204, the secure element 206, and the communication interface 208 can represent an exemplary embodiment of the NFC/WPT module 102, the cellular module 108, the secure element 110, and the communication interface 116, respectively. Additionally, the WPT enabled communication device 200 can further include a Bluetooth Module, a GPS module, a host processor, and/or a WLAN module such as the Bluetooth Module 104, the GPS module 106, the host processor 112, and/or the WLAN module 114, respectively. The Bluetooth Module, the GPS module, the host processor, and/or the WLAN module are communicatively coupled to the NFC/WPT module 202, the cellular module 204, and/or the secure element 206 via the communication interface 208.

The NFC/WPT module 202 provides wireless communication between the WPT enabled communication device 200 and another NFC capable device in accordance with various NFC standards in the reader or in the tag mode of operations as well as WPT from the wireless power transmitter in a substantially similar manner as the NFC/WPT module 102. The NFC/WPT module 202 includes a front end module 210 and an NFC controller 212.

The front end module 210 provides an interface between the NFC/WPT module 202 and another NFC capable device and/or the wireless power transmitter. The front end module 210 receives a received WPT signal 250 from the wireless power transmitter. The front end module 210 derives or harvests power from the received WPT signal 250 to provide a harvested WPT power to a FEM-CI communication interface 252 for routing to the NFC/WPT module 202, the cellular module 204, the secure element 206 and/or other modules within the WPT enabled communication device 200 via the communications interface 208. In an exemplary embodiment, the communication interface 208 routes the harvested WPT power from the FEM-CI communication interface 252 to a power management unit (PMU) 214 of the cellular module 204.

Additionally, when the NFC/WPT module 202 is operating in the reader mode of operation, the front end module 210 generates a magnetic field, referred to as a transmitted NFC communication signal 256, which is then modulated by another NFC capable device with information to form a received NFC communication signal 254. The front end module 210 can also modulate the magnetic field with information, such as data and/or one or more commands, that is received from a FEM-CTRLR communication interface 258 to form the transmitted NFC communication signal 256 when the NFC/WPT module 202 is operating in the reader mode of operation. Alternatively, when the NFC/WPT module 202 is operating in the tag mode of operation, the front end module 210 inductively receives the received NFC communication signal 254 which represents a magnetic field generated by another NFC capable device that can be modulated with information. The front end module 210 can also modulate the magnetic field with information, such as data and/or one or more commands, that is received from a FEM-CTRLR communication interface 258 to form the transmitted NFC communication signal 256 when the NFC/WPT module 202 is operating in the tag mode of operation. Optionally, the front end module 210 derives or harvests power from the received NFC communication signal 254 to provide a harvested NFC power to the NFC controller 212 via the FEM-CTRLR communication interface 258.

The front end module 210 recovers then provides information from the received NFC communication signal 254 to the controller module 212 via the FEM-CTRLR communication interface 258 when the NFC/WPT module 202 is operating in the reader and tag modes of operation. Specifically, the front end module 210 converts its own magnetic field when the NFC/WPT module 202 is operating in the reader mode of operation or the magnetic field generated by another NFC capable device when the NFC/WPT module 202 is operating in the tag mode of operation into a voltage and/or a current and recovers the information from the voltage and/or the current.

The NFC controller 212 controls overall operation and/or configuration of the NFC/WPT module 202. The NFC controller 212 receives information and/or the harvested NFC power from the front end module 210 via the FEM-CTRLR communication interface 258. Additionally, the NFC controller 212 can route the information and/or the harvested NFC power from the FEM-CTRLR communication interface 258 to a CTRLR-CI communication interface 260 for routing to the NFC/WPT module 202, the cellular module 204, the secure element 206, and/or other modules within the WPT enabled communication device 200 via the communication interface 208. Further, the NFC controller 212 can receive information from the NFC/WPT module 202, the cellular module 204, the secure element 206, and/or other modules within the WPT enabled communication device 200 via the CTRLR-CI communication interface 260. The NFC controller 212 can route the information received from the CTRLR-CI communication interface 260 to the front end module 210 via the FEM-CTRLR communication interface 258. Further, the NFC controller 212 can execute one or more commands provided by the information from the FEM-CTRLR communication interface 258 and/or the CTRLR-CI communication interface 260 to control overall operation and/or configuration of the NFC/WPT module 202.

Typically, the NFC/WPT module 202 is fabricated using the high voltage semiconductor process to form a first portion of the NFC/WPT module 202, namely the front end module 210 and the low voltage semiconductor process to form a second portion of the NFC/WPT module 202, namely the NFC controller 212. The high voltage semiconductor process can be used to form high voltage semiconductor process integrated circuits of the front end module 210 while the low voltage semiconductor process can be used to form low voltage semiconductor process integrated circuits of the NFC controller 212. The high voltage semiconductor process integrated circuits of the front end module 210 and the low voltage semiconductor process integrated circuits of the NFC controller 212 can be fabricated onto a single semiconductor substrate. Alternatively, the high voltage semiconductor process integrated circuits of the front end module 210 and the low voltage semiconductor process integrated circuits of the NFC controller 212 can be fabricated onto multiple semiconductor substrates, chips, and/or dies. In this alternative, the high voltage semiconductor process integrated circuits of the front end module 210 can be fabricated onto a first semiconductor substrate from among the multiple semiconductor substrates, chips, and/or dies and the low voltage semiconductor process integrated circuits of the NFC controller 212 can be fabricated onto a second semiconductor substrate from among the multiple semiconductor substrates, chips, and/or dies.

The cellular module 204 provides wireless communication between the WPT enabled communication device 200 and another cellular capable device over a cellular network in accordance with various cellular communication standards in a substantially similar manner as the cellular module 108. The cellular module 204 includes the PMU 214, a baseband module 216, and a radio frequency module 218.

The PMU 214 is responsible for battery and power system management of the cellular module 204 and/or the WPT enabled communication device 200. The PMU 214 receives various power signals from the NFC/WPT module 202, the cellular module 204, the secure element 206, and/or other modules within the WPT enabled communication device 200 from the communication interface 208 via a PMU-CI communication interface 262. In an exemplary embodiment, the PMU 214 receives the harvested WPT power from the NFC/

WPT module 202 via the PMU-CI communication interface 262. In this exemplary embodiment, the PMU 214 can use the harvested WPT power to form various power signals and route these various power signals to the PMU-CI communication interface 262 to provide power to the NFC/WPT module 202, the secure element 206, and/or other modules within the WPT enabled communication device 200 via the communication interface 208. The PMU 214 can monitor the power signals received from the PMU-CI communication interface 262 to monitor current, voltages, and/or temperature readings within the WPT enabled communication device 200. Additionally, the PMU 214 can use the power signals received from the PMU-CI communication interface 262 to monitor power connections and battery charges and/or to charge batteries when necessary. Further, the PMU 214 can use the power signals received from the PMU-CI communication interface 262 to control and/or to provide other power signals to the PMU-CI communication interface 262 to provide power to the NFC/WPT module 202, the secure element 206, and/or other modules within the WPT enabled communication device 200 via the communication interface 208.

The baseband module 216 controls operation of the cellular module 204. The baseband module 216 receives information from the radio frequency module 218 via a BB-RFM communication interface 264. Additionally, the baseband module 216 can provide the information from the BB-RFM communication interface 264 to a BB-CI communication interface 266 for routing to the NFC/WPT module 202, the secure element 206, and/or other modules within the WPT enabled communication device 200 via the communication interface 208. Further, the baseband module 216 can receive information from the NFC/WPT module 202, the secure element 206, and/or other modules within the WPT enabled communication device 200 from the communications interface 208 via the BB-CI communication interface 266. The baseband module 216 can route the information received from the BB-CI communication interface 266 to the radio frequency module 218 via the BB-RFM communication interface 264. Further, the baseband module 216 can execute one or more commands provided by the information from the BB-RFM communication interface 264 and/or the BB-CI communication interface 266 to control overall operation and/or configuration of the cellular module 204.

The radio frequency module 218 downconverts, demodulates, and/or decodes a received cellular communication signal 270 to provide information to the baseband module 216 via the BB-RFM communication interface 264. The radio frequency module 218 can convert the received cellular communication signal 270 from an analog representation to a digital representation. The radio frequency module 218 upconverts, modulates, and/or encodes information received from the baseband module 216 via the BB-RFM communication interface 264 to provide a transmitted cellular communication signal 270. The radio frequency module 218 can convert the information received from the BB-RFM communication interface 264 from a digital representation to an analog representation.

Typically, the cellular module 204 is fabricated using the high voltage semiconductor process to form the PMU 214 and the low voltage semiconductor process to form the baseband module 216 and the radio frequency module 218. The high voltage semiconductor process can be used to form high voltage semiconductor process integrated circuits of the PMU 214 while the low voltage semiconductor process can be used to form low voltage semiconductor process integrated circuits of the baseband module 216 and the radio frequency module 218. The high voltage semiconductor process integrated circuits of the PMU 214 and the low voltage semiconductor process integrated circuits of the baseband module 216 and the radio frequency module 218 can be fabricated onto a single semiconductor substrate. Alternatively, the high voltage semiconductor process integrated circuits of the PMU 214 and the low voltage semiconductor process integrated circuits of the baseband module 216 and the radio frequency module 218 can be fabricated onto multiple semiconductor substrates, chips, and/or dies. In this alternative, the high voltage semiconductor process integrated circuits of the PMU 214 can be fabricated onto a first semiconductor substrate from among the multiple semiconductor substrates, chips, and/or dies and the low voltage semiconductor process integrated circuits of the baseband module 216 and the radio frequency module 218 can be fabricated onto a second semiconductor substrate, or substrates, from among the multiple semiconductor substrates, chips, and/or dies. In some situations, other modules of the WPT enabled communication device 200 that are fabricated using the low voltage semiconductor process, such as the NFC controller 212 to provide an example, can also be fabricate on the single semiconductor substrate and/or the multiple semiconductor substrates, chips, and/or dies along with the baseband module 216 and the radio frequency module 218. In others situations, other modules of the WPT enabled communication device 200 that are fabricated using the high voltage semiconductor process, such as the front end module 210 to provide an example, can also be fabricate on the single semiconductor substrate and/or the multiple semiconductor substrates, chips, and/or dies along with the PMU 214.

The secure element 206 securely stores applications and/or information within the WPT enabled communication device 200 and provides for an environment to secure execution of these applications in a substantially similar manner as the secure element 110. The secure element 206 can receive the applications and/or the information from the NFC/WPT module 202, the cellular module 204, and/or other modules within the WPT enabled communication device 200 from the communication interface 208 via a SE-CI communication interface 268. The secure element 206 can provide the information and/or other information generated by to applications to the SE-CI communication interface 268 for routing onto the NFC/WPT module 202, the cellular module 204, and/or other modules within the WPT enabled communication device 200 via the communication interface 208.

Figure 3:
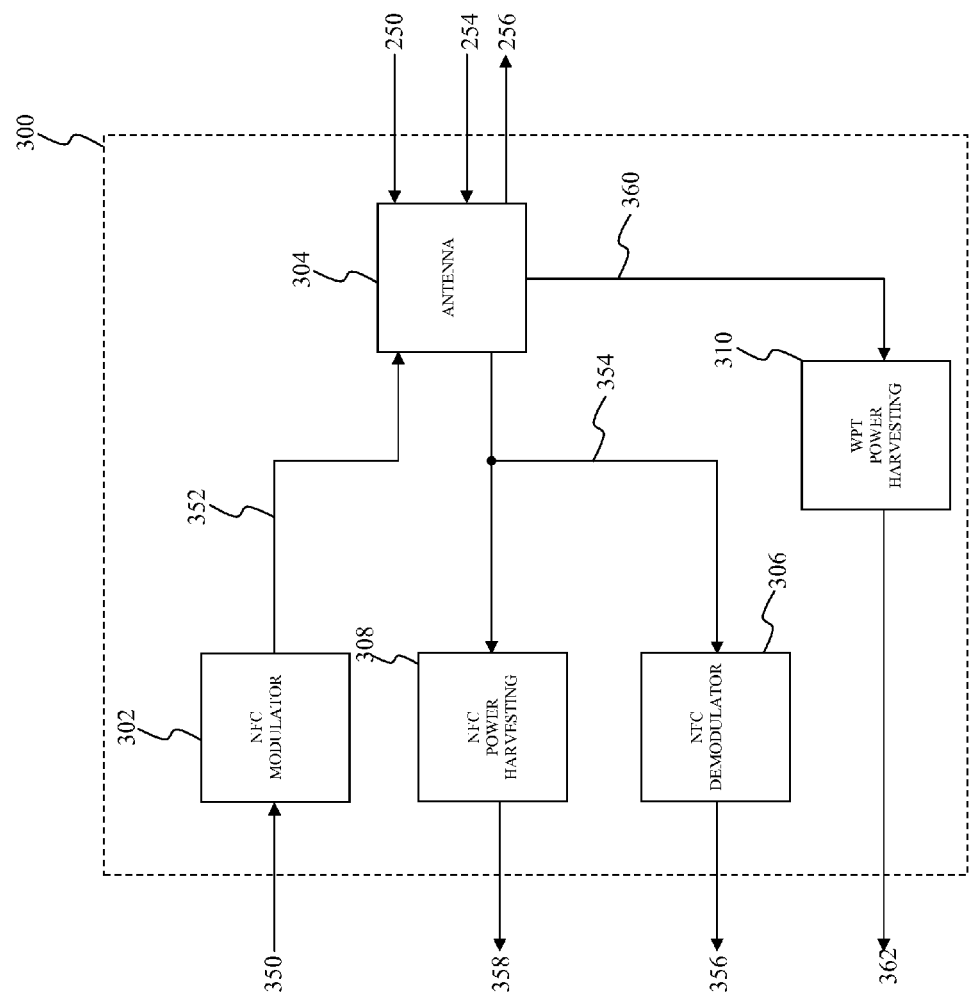
FIG. 3 illustrates an exemplary front end module that can be implemented within the first exemplary WPT enabled communication device according to an exemplary embodiment of the present disclosure.

Exemplary Front End Module that can be Implemented within the First Exemplary WPT Enabled Communication Device FIG. 3 illustrates an exemplary front end module that can be implemented within the first exemplary WPT enabled communication device according to an exemplary embodiment of the present disclosure. A front end module 300 provides an interface between a WPT enabled communication device, such as the WPT enabled communication device 100 or the WPT enabled communication device 200 to provide some examples, and an NFC capable device and/or a wireless power transmitter. The front end module 300 inductively receives various signals from the NFC capable device and/or the wireless power transmitter and recovers information and various power signals from these various signals. The front end module 300 includes an NFC modulator module 302, an antenna module 304, an NFC demodulator module 306, an NFC power harvesting module 308, and a WPT power harvesting module 310. The front end module 300 can represent an exemplary embodiment of the front end module 210.

The NFC modulator module 302 modulates transmission information 350 onto a carrier wave, such as a radio frequency carrier wave having a frequency of approximately 13.56 MHz to provide an example, using any suitable analog or digital modulation technique to provide a modulated information signal 352 when the WPT enabled communication device is operating in the reader mode of operation. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The transmission information 350 can be received from other modules of the WPT enabled communication device over a communication interface, such as the FEM-CTRLR communication interface 258 to provide an example. In some situations, the NFC modulator module 302 can simply provide the carrier wave as the modulated information signal 352. Additionally, the NFC modulator module 302 can modulate the transmission information 350 using the suitable analog or digital modulation technique to provide the modulated information signal 352 when the WPT enabled communication device is operating in the tag mode of operation.

The antenna module 304 inductively receives the received WPT signal 250 from the wireless power transmitter to provide a recovered WPT signal 360 and/or the received NFC communication signal 254 from another NFC capable device to provide a recovered NFC communication signal 354. The antenna module 304 can include a first inductive coupling element such as a first resonant tuned circuit to provide an example, that is tuned to receive the received WPT signal 250 and a second inductive coupling element such as a second resonant tuned circuit to provide an example, that is tuned to receive the received NFC communication signal 254. For example, the first inductive coupling element can be tuned between approximately 100 kHz and 250 kHz to receive the received WPT signal 250 and the second element can be tuned to approximately 13.56 MHz to receive the received NFC communication signal 254. Alternatively, the antenna module 304 can include a single inductive coupling element such as a resonant tuned circuit to provide an example, that is tuned to receive the received WPT signal 250 and the received NFC communication signal 254. In this alternate, the single inductive coupling element can resonant at a first frequency to receive the received WPT signal 250 and a second frequency to receive the received NFC communication signal 254. Alternatively, the single inductive coupling element can represent a wideband coupling element that can receive the received WPT signal 250 and the received NFC communication signal 254.

Additionally, the antenna module 304 provides the transmitted NFC communication signal 256 based upon the modulated information signal 352. When the WPT enabled communication device is operating in the reader mode of operation, the antenna module 304 applies the modulated information signal 352 to the second inductive coupling element or the single inductive coupling element to generate a magnetic field that represents the transmitted NFC communication signal 256. Alternatively, the antenna module 304 can apply the modulated information signal 352 to the second inductive coupling element or the single inductive coupling element to modulate a magnetic field that is inductively coupled onto either of these inductive coupling elements with the modulated information signal 352 to provide the transmitted NFC communication signal 256.

The NFC demodulator module 306 demodulates the recovered NFC communication signal 354 using any suitable analog or digital demodulation technique to provide a recovered information signal 356. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The recovered information signal 356 can be provided to other modules of the WPT enabled communication device over a communication interface, such as the FEM-CTRLR communication interface 258 to provide an example.

The NFC power harvesting module 308 derives or harvests power from the recovered NFC communication signal 354 to provide a harvested NFC power 358. In an exemplary embodiment, the NFC power harvesting module 308 includes a rectifier to rectify the recovered NFC communication signal 354 to provide a rectified NFC power. In this exemplary embodiment, the NFC power harvesting module 308 additionally includes a regulator to regulate the rectified NFC power to provide the harvested NFC power 358. In some situations, the harvested NFC power 358 can be provided to other modules of the WPT enabled communication device over a communication interface, such as the FEM-CTRLR communication interface 258 to provide an example.

The WPT power harvesting module 310 derives or harvests power from the recovered WPT signal 360 to provide a harvested WPT power 362. In an exemplary embodiment, the WPT power harvesting module 310 includes a rectifier to rectify the recovered WPT signal 360 to provide a rectified WPT power. In this exemplary embodiment, the WPT power harvesting module 310 additionally includes a regulator to regulate the rectified WPT power to provide the harvested WPT power 362. In some situations, the harvested WPT power 362 can be provided to other modules of the WPT enabled communication device over a communication interface, such as the FEM-CI communication interface 252 to provide an example.

Second Exemplary WPT Enabled Communication Device

Generally, a WPT enabled communication device, such as the WPT enabled communication device 100 or the WPT enabled communication device 200 to provide some examples can be fabricated onto multiple semiconductor substrates, chips, and/or dies that are communicatively coupled to one another. Some of the multiple semiconductor substrates, chips, and/or dies can be fabricated using a high voltage semiconductor process while other semiconductor substrates, chips, and/or dies be fabricated using a low voltage semiconductor process. This allows various combinations of modules of the WPT enabled communication device that are fabricated using the high voltage semiconductor to combined onto one or more first semiconductor substrates, chips, and/or dies while those modules of the WPT enabled communication device that are fabricated using the low voltage semiconductor can be combined onto one or more second semiconductor substrates, chips, and/or dies. As a result, Original Equipment Manufacturers (OEMs) can offer multiple product lines for the WPT enabled communication device that have varying capabilities around the one or more first semiconductor substrates, chips, and/or dies and/or the second set of one or more semiconductor packages and/or the one or more second semiconductor substrates, chips, and/or dies. For example, OEMs can combine the front end module 210 and the PMU 214 onto a single semiconductor substrate, chip, and/or die that can be universally coupled to various combinations of the NFC controller 212, the baseband module 216, and the radio frequency module 218.

Figure 4:
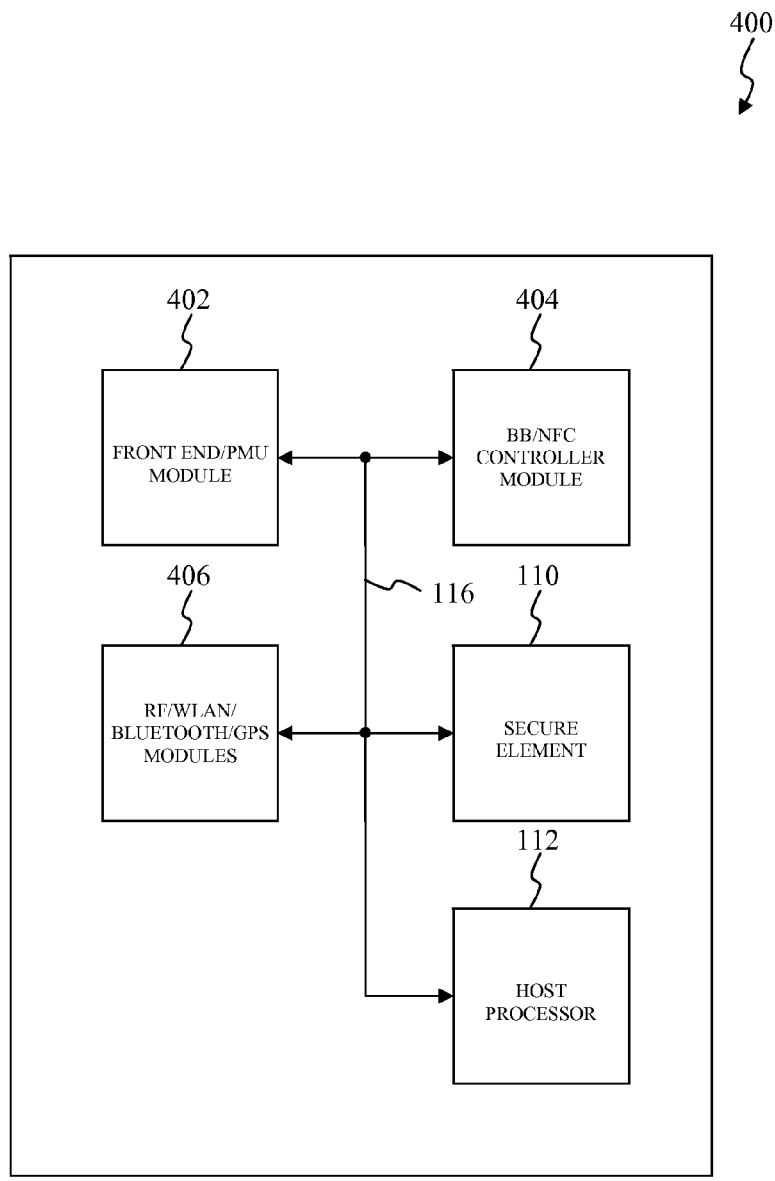
FIG. 4 illustrates a block diagram of a second exemplary WPT enabled communication device according to an exemplary embodiment of the present disclosure.

FIG. 4 illustrates a block diagram of a second exemplary WPT enabled communication device according to an exemplary embodiment of the present disclosure. A WPT enabled communication device 400 includes one or more integrated circuits that are configured and arranged to form one or more modules that are used to communicate information over wired and/or wireless communication networks in accordance with various communication standards. Some of these modules, or portions thereof, that operate at greater power levels can be fabricated using the high voltage semiconductor process while other modules that operated at greater speeds are typically formed using the low voltage semiconductor process. Some of those modules that are fabricated using the high voltage semiconductor can be combined onto one or more first semiconductor substrates, chips, and/or dies while those modules that are fabricated using the low voltage semiconductor can be combined onto one or more second semiconductor substrates, chips, and/or dies. The WPT enabled communication device 400 includes the secure element 110, the host processor 112, a combined front end/PMU module 402, a combined baseband/NFC controller module 404, and a combined RF/WLAN/Bluetooth/GPS module 406.

A front end module, such as the front end module 210 to provide an example, and a PMU, such as the PMU 214 to provide an example, can be fabricated using the high voltage semiconductor process. This allows the front end module and the PMU to be fabricated onto a single semiconductor substrate, chip, and/or die to form the combined front end/PMU module 402. The combined front end/PMU module 402 provides an interface between the combined front end/PMU module 402 and another NFC capable device and/or wireless power transmitter in a substantially similar manner as the front end module 210. Additionally, combined front end/PMU module 402 is responsible for battery and power system management the WPT enabled communication device 400 in a substantially similar manner as the PMU 214.

A baseband module, such as the baseband module 216 to provide an example, and an NFC controller module, such as the NFC controller 212 to provide an example, example, can be fabricated using the low voltage semiconductor process. This allows the baseband module and the NFC controller module to be fabricated onto a single semiconductor substrate, chip, and/or die to form the combined baseband/NFC controller module 404. The combined baseband/NFC controller module 404 controls cellular and NFC communications of the WPT enabled communication device 400 in a substantially similar manner as the baseband module 216 and the NFC controller 212, respectively.

A radio frequency module, such as the radio frequency module 218 to provide an example, a WLAN module, such as the WLAN module 114 to provide an example, a Bluetooth module, such as the Bluetooth Module 104 to provide an example, a GPS module, such as the GPS module 106 to provide an example, can be fabricated using the low voltage semiconductor process. This allows the RF module, the WLAN module, the Bluetooth module, and the GPS module to be fabricated onto a single semiconductor substrate, chip, and/or die to form the combined RF/WLAN/Bluetooth/GPS module 406. The combined RF/WLAN/Bluetooth/GPS module 406 provides cellular, wireless network, and Bluetooth communication in a substantially similar manner as the radio frequency module 218, the WLAN module 114, and the Bluetooth Module 104, respectively. Additionally, the combined RF/WLAN/Bluetooth/GPS module 406 can calculate the position of the WPT enabled communication device 400 in a substantially similar manner as the GPS module 106.

The combined front end/PMU module 402, the combined baseband/NFC controller module 404, and/or the combined RF/WLAN/Bluetooth/GPS module 406 effectively split or separate NFC and/or cellular communication capabilities of the WPT enabled communication device 400 over multiple modules. For example, the combined front end/PMU module 402 and the combined baseband/NFC controller module 404 operate in conjunction with one another to provide wireless communication between the WPT enabled communication device 400 and another NFC capable device in accordance with various NFC standards. As another example, the combined baseband/NFC controller module 404 and the combined RF/WLAN/Bluetooth/GPS 406 operate in conjunction with one another to provide wireless communication between the WPT enabled communication device 400 and another cellular capable device over a cellular network in accordance with various cellular communication standards. However, these examples are not limiting, those skilled in the relevant art(s) will recognize that various modules of the WPT enabled communication device 400 can be combined differently without departing from the spirit and scope of the present invention. For example, the secure element 110 and the host processor 112 can be fabricated onto a single semiconductor substrate, chip, and/or die to form a combined processor/secure element module.

Further Illustration of the Second Exemplary WPT Enabled Communication Device

FIG. 5 further illustrates the block diagram of the second exemplary WPT enabled communication device according to an exemplary embodiment of the present disclosure. A WPT enabled communication device 500 includes one or more integrated circuits that are configured and arranged to form one or more modules that are used to communicate information over wired and/or wireless communication networks in accordance with various communication standards. Some of these modules, or portions thereof, that operate at greater power levels can be fabricated using the high voltage semiconductor process. Some of these modules, or portions thereof, that are fabricated using the high voltage semiconductor process can be fabricated along with other modules, or portions thereof, that are also fabricated using the high voltage semiconductor process onto a single semiconductor substrate, chip, and/or die. Some of these modules, or portions thereof, that operate at greater power speeds can be fabricated using the low voltage semiconductor process. Some of these modules, or portions thereof, that are fabricated using the low voltage semiconductor process can be fabricated along with other modules, or portions thereof, that are also fabricated using the low voltage semiconductor process onto a single semiconductor substrate, chip, and/or die.

The WPT enabled communication device 500 includes a combined front end/PMU module 502, a combined baseband/NFC controller module 504, a combined RF/WLAN/Bluetooth/GPS module 506, and a secure element 508 which are communicatively coupled to one another via a communication interface 510. The WPT enabled communication device 500 can represent an exemplary embodiment of the WPT enabled communication device 400. As such, the combined front end/PMU module 502, the combined baseband/NFC controller module 504, and the combined RF/WLAN/Bluetooth/GPS module 506 can represent an exemplary embodiment of the combined front end/PMU module 402, the combined baseband/NFC controller module 404, and the combined RF/WLAN/Bluetooth/GPS module 406, respectively. Additionally, the WPT enabled communication device 500 can further include a host processor such as the host processor 112. The host processor is communicatively coupled to the combined front end/PMU module 502, the combined baseband/NFC controller module 504, the combined RF/WLAN/Bluetooth/GPS module 506, and/or the secure element 508 via the communication interface 510.

The combined front end/PMU module 502 provides an interface between the combined front end/PMU module 502 and another NFC capable device and/or wireless power transmitter in a substantially similar manner as the combined front end/PMU module 402. The combined front end/PMU module 502 includes a front end module 512 and a PMU 514.

The front end module 512 receives the received WPT signal 250 from the wireless power transmitter and derives or harvests power from the received WPT signal 250 to provide a harvested WPT power to a FEM-PMU communication interface 550 for routing to the PMU 514. In an exemplary embodiment, the PMU 214 routes the harvested WPT power from the FEM-PMU communication interface 550 to the combined baseband/NFC controller module 504, the combined RF/WLAN/Bluetooth/GPS module 506, and/or other modules within the WPT enabled communication device 500 via the communications interface 510 in a substantially similar manner as the front end module 210.

Additionally, when the WPT enabled communication device 500 is operating in the reader and/or tag modes of operation, the front end module 512 receives the received NFC communication signal 254 from another NFC capable device in a substantially similar manner as the front end module 210. The front end module 210 recovers then provides information and/or a harvested NFC power from the received NFC communication signal 254 to a FEM-CI communication interface 552 for routing to the combined baseband/NFC controller module 504, the combined RF/WLAN/Bluetooth/GPS module 506, and/or other modules within the WPT enabled communication device 500 via the communications interface 510 in a substantially similar manner as the front end module 210. Optionally, the front end module 510 derives or harvests power from the received NFC communication signal 254 to provide a harvested NFC power to a NFC controller 516 of the combined baseband/NFC controller module 504 via the FEM-CI communication interface 552 in a substantially similar manner as the front end module 210.

Further, the front end module 512 can receive information from the combined baseband/NFC controller module 504, the combined RF/WLAN/Bluetooth/GPS module 506, and/or other modules within the WPT enabled communication device 500 via the FEM-CI communication interface 552. The front end module 512 can modulate its own magnetic field when the WPT enabled communication device 500 is operating in the reader mode of operation or the magnetic field generated by another NFC capable device when the WPT enabled communication device 500 with the information to provide the transmitted NFC communication signals 256 in a substantially similar manner as the front end module 210.

The PMU 514 is responsible for battery and power system management of the combined baseband/NFC controller module 504 and/or the WPT enabled communication device 500 in a substantially similar manner as the PMU 214. The PMU 514 receives various power signals from the front end module 512, the combined baseband/NFC controller module 504, the combined RF/WLAN/Bluetooth/GPS module 506, and/or other modules within the WPT enabled communication device 500 from the FEM-PMU communication interface 550 and/or the communication interface 510 via a PMU-CI communication interface 554. Additionally, the PMU 214 can use the power signals received from the FEM-PMU communication interface 550 and/or the PMU-CI communication interface 554 to monitor power connections and battery charges and/or to charge batteries when necessary. Further, the PMU 214 can use the power signals received from the FEM-PMU communication interface 550 and/or the PMU-CI communication interface 554 to control and/or to provide other power signals to the FEM-PMU communication interface 550 and/or the PMU-CI communication interface 554 to provide power to the front end module 512, the combined baseband/NFC controller module 504, the combined RF/WLAN/Bluetooth/GPS module 506, and/or other modules within the WPT enabled communication device 500 via the communication interface 510.

The combined baseband/NFC controller module 504 controls cellular and NFC communications of the WPT enabled communication device 500 in a substantially similar manner as the combined baseband/NFC controller module 404. The combined baseband/NFC controller module 504 includes the NFC controller 516 and a baseband module 518. The NFC controller 516 controls overall operation and/or configuration of the NFC communications of the WPT enabled communication device 500 in a substantially similar manner as the NFC controller 212. The NFC controller 516 receives information and/or the harvested NFC power from the combined front end/PMU module 502, the baseband module 518, the combined RF/WLAN/Bluetooth/GPS module 506, and/or other modules within the WPT enabled communication device 500 from a CI-CTRLR communication interface 556. Additionally, the NFC controller 212 can route the information and/or the harvested NFC power to the CI-CTRLR communication interface 556 for routing to the combined front end/PMU module 502, the baseband module 518, the combined RF/WLAN/Bluetooth/GPS module 506, and/or other modules within the WPT enabled communication device 500 via the communication interface 510.

The baseband module 518 controls overall operation and/or configuration of the cellular communications of the WPT enabled communication device 500 in a substantially similar manner as the NFC controller 216. The baseband module 216 receives information from the NFC controller 516, the combined front end/PMU module 502, the combined RF/WLAN/Bluetooth/GPS module 506, and/or other modules within the WPT enabled communication device 500 from a CI-BB communication interface 558. Additionally, the baseband module 216 can provide information to the CI-BB communication interface 558 for routing to the NFC controller 516, the combined front end/PMU module 502, the combined RF/WLAN/Bluetooth/GPS module 506, and/or other modules within the WPT enabled communication device 500 via the communication interface 510.

The combined RF/WLAN/Bluetooth/GPS module 506 provides cellular, wireless network, and Bluetooth communication in a substantially similar manner as the RF/WLAN/Bluetooth/GPS module 406, respectively. Additionally, the combined RF/WLAN/Bluetooth/GPS module 506 can calculate the position of the WPT enabled communication device 500 in a substantially similar manner as the RF/WLAN/Bluetooth/GPS module 406. The combined RF/WLAN/Bluetooth/GPS module 506 includes a radio frequency module 520, a WLAN module 522, a Bluetooth module 524, and a GPS module 526.

The radio frequency module 520 downconverts, demodulates, and/or decodes received cellular communication signals to provide information to a RF-CI communication interface 558 for routing to the combined front end/PMU module 502, the combined baseband/NFC controller module 504, the WLAN module 522, the Bluetooth module 524, the GPS module 526 and/or other modules within the WPT enabled communication device 500 via the communication interface 510 in a substantially similar manner as the radio frequency module 218. Additionally, the radio frequency module 520 upconverts, modulates, and/or encodes information received from the combined front end/PMU module 502, the combined baseband/NFC controller module 504, the WLAN module 522, the Bluetooth module 524, the GPS module 526 and/or other modules within the WPT enabled communication device 500 via the RF-CI communication interface 558 to provide transmitted cellular communication signals in a substantially similar manner as the radio frequency module 218.

The WLAN module 522 provides wireless communication between the WPT enabled communication device 500 and another WLAN capable device over a wired and/or wireless communication network in accordance with various networking protocols in a substantially similar manner as the WLAN module 114. The WLAN module 522 can receive information from the combined front end/PMU module 502, the combined baseband/NFC controller module 504, the radio frequency module 520, the Bluetooth module 524, the GPS module 526 and/or other modules within the WPT enabled communication device 500 via the RF-CI communication interface 558. Additionally, the WLAN module 522 can provide information to the RF-CI communication interface 558 for routing to the combined front end/PMU module 502, the combined baseband/NFC controller module 504, the radio frequency module 520, the Bluetooth module 524, the GPS module 526 and/or other modules within the WPT enabled communication device 500 via the communication interface 510.

The Bluetooth module 524 provides wireless communication between the WPT enabled communication device 500 and another Bluetooth capable device in accordance with various Bluetooth or Bluetooth Low Energy (BLE) standards in a substantially similar manner as the Bluetooth module 104. The Bluetooth module 524 can receive information from the combined front end/PMU module 502, the combined baseband/NFC controller module 504, the radio frequency module 520, the WLAN module 522, the GPS module 526 and/or other modules within the WPT enabled communication device 500 via the RF-CI communication interface 558. Additionally, the Bluetooth module 524 can provide information to the RF-CI communication interface 558 for routing to the combined front end/PMU module 502, the combined baseband/NFC controller module 504, the WLAN module 522, the Bluetooth module 524, the GPS module 526 and/or other modules within the WPT enabled communication device 500 via the communication interface 510.

The GPS module 526 receives various signals from various satellites to calculate a position of the WPT enabled communication device 500 in a substantially similar manner as the GPS module 106. The GPS module 526 can receive information from the combined front end/PMU module 502, the combined baseband/NFC controller module 504, the radio frequency module 520, the WLAN module 522, the Bluetooth module 524, and/or other modules within the WPT enabled communication device 500 via the RF-CI communication interface 558. Additionally, the GPS module 526 can provide information to the RF-CI communication interface 558 for routing to the combined front end/PMU module 502, the combined baseband/NFC controller module 504, the WLAN module 522, the Bluetooth module 524, and/or other modules within the WPT enabled communication device 500 via the communication interface 510.

The secure element 508 securely stores applications and/or information within the WPT enabled communication device 500 and provides for an environment to secure execution of these applications in a substantially similar manner as the secure element 110. The secure element 206 can receive the applications and/or the information from the combined front end/PMU module 502, the combined baseband/NFC controller module 504, the combined RF/WLAN/Bluetooth/GPS module 506, and/or other modules within the WPT enabled communication device 500 from the communication interface 510 via a SE-CI communication interface 560. The secure element 206 can provide the information and/or other information generated by to applications to the SE-CI communication interface 560 for routing onto the combined front end/PMU module 502, the combined baseband/NFC controller module 504, the combined RF/WLAN/Bluetooth/GPS module 506, and/or other modules within the WPT enabled communication device 500 via the communication interface 510.

CONCLUSION

It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wireless power transfer (WPT) enabled communication device, comprising:
   a plurality of modules configured to provide communication with a plurality of communication devices according to a plurality of communication standards;
   a communication interface configured to communicatively couple the plurality of modules to one another,
   wherein a first module from among the plurality of modules is configured to implement a near field communication (NFC) standard and a WPT standard from among the plurality of communication standards, the first module comprising a front end module (FEM) communicatively coupled to an NFC controller, the FEM being fabricated using a high voltage semiconductor process and the NFC controller being fabricated using a low voltage semiconductor process,
   wherein the FEM is configured to communicate with an NFC capable device from among the plurality of communication devices in accordance with the NFC standard or with a second WPT enabled communication device from among the plurality of communication devices in accordance with the WPT standard.

2. The WPT enabled communication device of claim 1, wherein the FEM is fabricated onto a first semiconductor substrate using the high voltage semiconductor process, and wherein the NFC controller is fabricated onto a second semiconductor substrate using the low voltage semiconductor process.

3. The WPT enabled communication device of claim 1, wherein the FEM is further configured to inductively receive a magnetic field from the NFC capable device, to recover information from the magnetic field, and to derive a harvested power from the magnetic field.

4. The WPT enabled communication device of claim 3, wherein the plurality of modules comprises:
a secure element configured to receive the harvested power.

5. The WPT enabled communication device of claim 1, wherein the FEM is further configured to receive a power transmission signal from a wireless power transmitter associated with the second WPT enabled communication device.

6. The WPT enabled communication device of claim 5, wherein the FEM is further configured to derive a harvested power from the power transmission signal and to provide the harvested power to a second module from among the plurality of modules.

7. The WPT enabled communication device of claim 5, wherein the second module from among the plurality of modules comprises:
a power management unit (PMU).

8. The WPT enabled communication device of claim 1, wherein the high voltage semiconductor process is characterized as allowing for greater operating voltages than the low voltage semiconductor process.

9. The WPT enabled communication device of claim 1, wherein the FEM is further configured to operate at a lesser power level or a lesser speed than the NFC controller.

10. The WPT enabled communication device of claim 1, wherein the high voltage semiconductor process comprises:
a Bipolar Complementary Metal Oxide Semiconductor (BiCMOS) process, and wherein the low voltage semiconductor process comprises:
a CMOS process.

11. The WPT enabled communication device of claim 1, wherein the WPT enabled communication device is fabricated onto a plurality of substrates, chips, or dies,
wherein the FEM is fabricated onto a first substrate, chip, or die from among the plurality of substrates, chips, or dies, and
wherein the NFC controller is fabricated onto a second substrate, chip, or die from among the plurality of substrates, chips, or dies that is separate from the first substrate, chip, or die.

12. The WPT enabled communication device of claim 1, wherein the first module further comprises:
a power management unit (PMU) configured to provide battery and power system management of the WPT enabled communication device, the FEM and the PMU being fabricated onto a first substrate, chip, or die from among a plurality of substrates, chips, or dies using the high voltage semiconductor process; and
a baseband (BB) controller configured to control cellular communications of the WPT enabled communication device, the BB controller and the NFC controller being fabricated onto a second substrate, chip, or die from among the plurality of substrates, chips, or dies using the low voltage semiconductor process.

13. A wireless power transfer (WPT) enabled communication device, comprising:
a plurality of modules configured to provide communication between the WPT enabled communication device and a plurality of communication devices according to a plurality of communication standards, the plurality of modules comprising:
a front end module (FEM), and
a near field, communication (NFC) controller,
wherein the FEM is configured to operate in conjunction with the NFC controller to implement an NFC standard and a WPT standard from among the plurality of communication standards,
wherein the FEM is fabricated using a high voltage semiconductor process and configured to communicate with an NFC capable device from among the plurality of communication devices in accordance with the NFC standard or with a second WPT enabled communication device from among plurality of communication devices in accordance with the WPT standard, and
wherein the NFC controller is fabricated using a low voltage semiconductor process.

14. The WPT enabled communication device of claim 13, wherein the FEM is configured to provide an interface between the NFC capable device and the WPT enabled communication device to communicate with the NFC capable device.

15. The WPT enabled communication device of claim 14, wherein the FEM is further configured to inductively receive a magnetic field from the NFC capable device, to recover information from the magnetic field, and to derive a harvested power from the magnetic field.

16. The WPT enabled communication device of claim 15, wherein the NFC controller is configured to receive the information and the harvested power from the FEM.

17. The WPT enabled communication device of claim 13, wherein the FEM is further configured to receive a power transmission signal from a wireless power transmitter associated with the second WPT enabled communication device.

18. The WPT enabled communication device of claim 17, further comprising:
a power management unit (PMU) configured to receive a harvested power that is derived from the power transmission signal and to provide a power signal based upon the harvested power to other modules from among the plurality of modules, the FEM and the PMU being fabricated onto a single substrate, chip, or die from among a plurality of substrates,chips, or dies using the high voltage semiconductor process.

19. The WPT enabled communication device of claim 13, wherein the plurality of modules further comprises:
a radio frequency (RF) module, and
a baseband (BB)controller,
wherein the RF module and the BB controller are configured to implement a cellular communication standard from among the plurality of communication standards, the BB controller and the NFC controller being fabricated onto a single substrate, chip, or die from among the plurality of substrates, chips, or dies using the low voltage semiconductor process.

20. The WPT enabled communication device of claim 13, wherein the high voltage semiconductor process is characterized as allowing for greater operating voltages than the low voltage semiconductor process.
a Bipolar Complementary Metal Oxide Semiconductor (BiCMOS) process, and wherein the lower voltage semiconductor process comprises:
a CMOS process.

21. The WPT enabled communication device of claim 13, wherein the high voltage semiconductor process comprises:

a Bipolar Complementary Metal Oxide Semiconductor (BiCMOS) process, and wherein the low voltage semiconductor process comprises:
a CMOS process.

22. The WPT enabled communication device of claim 13, wherein the WPT enabled communication device is fabricated onto a plurality of substrates, chips, or dies,
wherein the FEM is fabricated onto a first substrate, chip, or die from among the plurality of substrates, chips, or dies, and
wherein the NFC controller is fabricated onto a second substrate, chip, or die from among the plurality of substrates, chips, or dies that is separate from the first substrate, chip, or die.

23. The WPT enabled communication device of claim 13, wherein the plurality of modules further comprises:
a power management unit (PMU) configured to provide battery and power system management of the WPT enabled communication device, the FEM and the PMU being fabricated onto a first substrate, chip, or die from among a plurality of substrates, chips, or dies using the high voltage semiconductor process; and
a baseband (BB) controller configured to control cellular communications of the WPT enabled communication device, the BB controller and the NFC controller being fabricated onto a second substrate, chip, or die from among the plurality of substrates, chips, or dies using the low voltage semiconductor process.

* * * * *

UNITED STATES PATENT AND TRADEMARK OFFICE
CERTIFICATE OF CORRECTION

PATENT NO.        : 9,281,871 B2
APPLICATION NO.   : 13/595020
DATED             : March 8, 2016
INVENTOR(S)       : Aaron Smith Page 1 of 1

It is certified that error appears in the above-identified patent and that said Letters Patent is hereby corrected as shown below:

Claims

In column 20, line 45, claim 18, please replace "substrates,chips" with --substrates, chips--.

In column 20, lines 62-65, claim 20, please remove "a Bipolar Complementary Metal Oxide Semiconductor (BiCMOS) process, and wherein the lower voltage semiconductor process comprises: a CMOS process.".

Signed and Sealed this
Seventeenth Day of May, 2016

Michelle K. Lee
*Director of the United States Patent and Trademark Office*